United States Patent Office 3,594,282
Patented July 20, 1971

3,594,282
PROCESS FOR PURIFYING L-ASPARAGINASE
Tsuneo Kagawa and Kazuo Mochizuki, Shizuoka-ken, and Masao Tanaka, Machida-shi, Japan, assignors to Kyowa Hakko Kogyo Co., Ltd., Tokyo, Japan
No Drawing. Filed Apr. 3, 1969, Ser. No. 813,287
Claims priority, application Japan, Apr. 5, 1968, 43/22,328
Int. Cl. C07g 7/028
U.S. Cl. 195—66A
15 Claims

ABSTRACT OF THE DISCLOSURE

A process for purifying L-asparaginase obtained from cells while maintaining the enzymic activity thereof. An extract from the cells is adjusted to a pH of 4.5 or less, thereby denaturing, coagulating and precipitating unnecessary proteins therefrom. A supernatant portion of the extract is then adsorbed on an ion exchanger and the L-asparaginase eluted therefrom. Alternatively, the pH of the supernatant can be adjusted to 8 or more, adsorbed by ion exchange and the L-asparaginase eluted. A loss of enzymic activity is encountered with a pH range of 4.5 to 8.0.

---

This invention relates to a process for purifying L-asparaginase. More particularly, it relates to a process for the purification of a highly active L-asparaginase enzymatic preparation. Even more particularly, the invention relates to the purification of L-asparaginase preparations obtained from L-asparaginase-producing cells which have been cultured in a suitable nutrient medium.

L-asparaginase, that is L-asparaginase-amide hydrolase (having an enzyme number of 3,5,1,1) is an enzyme which hydrolyzes an L-asparagine into an L-aspartic acid and ammonia. L-asparaginase is relatively extensively distributed in both the animal and the plant worlds, although many of the details of its properties are still unknown.

Recently, L-asparaginase has attracted much attention because it has been found that a specific type of enzyme produced by, for example, the serum of a guinea pig or a certain strain of *Escherichia coli*, possesses an anti-tumor activity and, in particular, has a high activity against leukemic cells which require L-asparagine.

Heretofore, the mass production of the enzyme L-asparaginase, particularly on a large scale sufficient to meet a mass use as a medicine, was extremely difficult because of problems such as the difficulty of culturing appropriate microorganisms cells on a mass scale which are to be used as a starting material and the difficulty of preserving the activity of the enzyme in the purification process. Therefore, a need has been felt for a mass culture and purification method which could be carried out on an industrial scale for producing a purified preparation of anti-leukemic L-asparaginase having a higher economical and practical value from L-asparaginase-producing microorganisms.

Accordingly, one of the objects of the present invention is to provide an improved process for the production of L-asparaginase preparations which overcomes the disadvantages and deficiencies of the prior art methods.

Another object of the present invention is to provide a process for purifying L-asparaginase.

A further object of the invention is to produce economically on an industrial scale enzymatic preparations of L-asparaginase of high purity. Such an industrial production of L-asparaginase obviously has a special utility because, for example, L-asparaginase produced by a microorganism belonging to the genus Serratia possesses an anti-leukemic activity.

A still further object of the invention is to provide enzymatic preparations of L-asparaginase having a high purity.

These and other objects and advantages of the present invention will become apparent to those skilled in the art from a consideration of the following specification and claims.

It may be assumed at first glance that the kinds of L-asparaginase enzymes which are covered by this invention, for example, L-asparaginase of strains belonging to the genus Serratia as well as serum L-asparaginase obtained from guinea pigs, are apparently easily purified because they seem to be in a stable state in view of their enzymic properties in a crude preparational stage, such as their stability to pH or heat. However, a mass production of these L-asparaginase enzymes on an industrial scale has been blocked up to date, partly because a totally unexpected loss of the enzymic activity, i.e., the specific activity thereof, occurs as the purity of the L-asparaginase is raised.

The present inventors previously discovered a method for culturing microorganisms belonging to the genus Serratia having a higher L-asparaginase activity than had been known theretofore (U.S. patent application Ser. No. 798,443, filed on Feb. 11, 1969). The inventors have now suceeded in establishing a process for purifying enzymes having an L-asparaginase activity from bacteria belonging to the genus Serratia and others to provide preparations of high purity.

Accordingly, pursuant to the present invention, the above objectives are met when the following procedure is carried out. As a first step, most of the unnecessary proteins from a crude enzyme solution are removed by coagulation by an acidic treatment, the crude enzyme solution being obtained from bacterial cells by rupturing, and centrifugal separation of debris and, thereafter, the L-asparaginase is made soluble. In a second step, the pH is maintained at 4.5 or lower, or 8.0 or higher, so that the L-asparaginase enzyme can be purified. This must be done in view of the peculiar range of pH wherein the activity of the enzymes of the invention remains stable. In this way, the present invention provides a process wherein L-asparaginase can be purified to give a preparation of high purity and a favorable yield. Preferably, the purification effect can be further strengthened by the addition of sodium chloride, glycerol, albumin, L-asparagine, etc. as an enzyme stabilizer. Hence, the invention is characterized in combining these methods for purifying a high-purity L-asparaginase having a high specific activity, thereby obtaining a product applicable for pharmaceutical purposes.

Bacterial cells used as a starting material in the invention are obtained by growing them either by means of a known plate culture method or by a submerged culture (U.S. patent application Ser. No. 798,443). The cells are then collected by centrifugal separation or by other convenient means. The thus-obtained cells are then suspended with a small quantity of buffer solution and, thereafter, L-asparaginase is readily rendered soluble by processing with a hogonenizer, by grinding, by destruction with supersonic waves, by treatment with lysozyme, by autolysis or by other methods. Subsequently, the desired L-asparaginase is removed from the cell debris by centrifugation. The crude enzymic liquid obtained at this preliminary stage is relatively stable against pH and heat. However, this crude enzymic liquid contains a large quantity of impure proteins and pigments. In order to remove these impurities, the liquid is adjusted to a pH of 3.5–4.5. With this adjustment of pH, most of the pigments and unnecessary proteins are denatured, coagulated and precipitated. The thus-formed precipitates are easily removed by centrifugal separation or by other methods. On the other hand, an L-asparaginase activity is retained in the supernatant liquid without losing its activity in the above-specified pH range. Therefore, the enzymic purity can be increased by ten to twenty times with respect to its specific activity after purification.

Subsequently, the obtained supernatant liquid is adsorbed by means of an ion exchange resin or an ion exchanger cellulose as is, after it has been diluted, or after it has been subjected to dialysis for properly adjusting the ionic strength thereof. Thereafter, the adsorbed material is eluted, purified and condensed. Alternatively, L-asparaginase can also be made insoluble with an addition of ammonium sulfate, sodium sulfate, acetone, methanol and the like. Afterwards, the thus-formed precipitate is collected, disolved and condensed.

The partially purified preparation obtained in accordance with the above-described acid denaturation process is unstable, compared with the L-asparaginase in the aforesaid crude extract liquid. A phenomenon is frequently observed in which the partially purified preparation quickly loses its activity even at a low temperature of 5° C. or lower. According to the studies of the present inventors, the partially purified enzymic preparation is extremely unstable in a pH range of 4.5 to 8.0. It has been found that it is necessary to keep the pH of a processed liquid within a range of either 3.0–4.5 or 8.0–11.0 and that by this pH adjustment, an inactivation of the present enzymes can be successfully prevented. It is then possible to increase the purity of the preparation in further steps as desired.

The sudden loss of activity discussed above may be noted from a consideration of Table 1 which shows experiments carried out at pH 7.0. These experiments attempted to remove, by means of electrodialysis, ammonium sulfate from precipitates salted out with an addition of ammonium sulfate from a supernatant liquid obtained by acid denaturation. The result of the experiments shown in the table compares the change of activity with the desalting rate of ammonium sulfate in three different stages of pH 4.0, 7.0 and 9.0, respectively, at a uniform temperature of 5° C. As mentioned above, a sharp loss of activity was noted at pH 7.0 during the desalting process using electrodialysis. This result shows that it is essential to conduct an electrodialysis and similar procedures within a pH range of either 3.0–4.5 or 8.0–11.0 limiting. The L-asparaginase activity is measured in units, one unit being expressed to indicate an enzymic activity which decomposes $1\mu$ mole of I-asparagine per minute.

EXAMPLE 1

One hundred grams of cells obtained by culturing *Serratia marcescens* ATCC 60 in a liquid nutrient culture medium under aerobic conditions with agitation was suspended in 150 ml. of a 0.01 M tris-HCl [tris(hydroxymethyl)aminomethane and hydrochloric acid] buffer solution of pH 8.5. The suspension was treated with a 10 kc. supersonic wave generator, thereby yielding a crude enzymic extract liquid. The L-asparaginase activity of the crude enzymic liquid was 0.1 unit per 1 mg. of protein The extract liquid was slowly adjusted to a pH of 3.5 with a hydrochloric acid solution. Immediately thereafter, the extract liquid was subjected to centrifugal separation, whereby most of the destructed bacterial cells and coagulated precipitates were removed. The activity purity of the thus-obtained supernatant liquid was increased by twelve times, as compared with the crude enzymic extract. The yield rate of the activity was 80%.

EXAMPLE 2

A supernatant liquid having a pH of 3.5, obtained in accordance with Example 1, was adjusted to pH 4.0 with an aqueous caustic soda (sodium hydroxide) solution. Thereafter, 0.01% by weight of bovine blood albumin was added thereto. The resultant mixture was diluted four times with water. Immediately thereafter, active L-asparaginase was adsorbed with carboxymethylcellulose (the cellulose had been buffered to pH 4.0 in advance). The L-asparaginase was eluted by means of a buffer solution of pH 4.0 which contained 0.25 mole per liter of sodium chloride. The specific activity of the L-asparaginase contained in the eluate was 72 times higher than that of the crude enzymic extract described in Example 1.

The thus-obtained purified enzymic liquid was desalted by electrodialysis while maintaining its pH at 4.0. An extremely small quantity of glycerol was then added thereto. Thereafter, the pH of the purified enzymic liquid was quickly changed to 9.0, and adsorption was conducted by

TABLE 1

| | pH of electrodialysed liquid | | | | | |
|---|---|---|---|---|---|---|
| | 4.0 | | 7.0 | | 9.0 | |
| Time for electrodialysis | Activity | Ammonium sulfate | Activity | Ammonium sulfate | Activity | Ammonium sulfate |
| Minutes: | | | | | | |
| 0 | 100 | 100 | 100 | 100 | 100 | 100 |
| 30 | 98 | 54 | 99 | 62 | 102 | 60 |
| 60 | 88 | 5.4 | 90 | 30 | 81 | 21 |
| 90 | 102 | 0.3 | 100 | 2.1 | 110 | 4.1 |
| 120 | 117 | 0.06 | 2 | 0.05 | 110 | 0.06 |

NOTE.—Figures given are in percent.

In an adsorption method, L-asparaginase is extremely favorably adsorbed by carboxymethylcellulose when a supernatant liquid of an acid denatured liquid is subjected to an adsorption processing at pH 4.0. Alternatively, at pH 9.0, the supernatant liquid is equally favorably adsorbed by a diethylaminoethyl-cellulose. The thus-adsorbed enzymic activity can be removed by elution using an inorganic salt, such as sodium chloride, or with a change of pH. In order to prevent a loss of enzymic activity, it is necessary to keep the pH range wtihin 3.0–4.5 or 8.0–11.0, similarly as discussed in connection with the electrodialysis procedure. Furthermore, it has been found remarkably effective to add as a stabilizer for the present enzymes a small amount of L-asparagine or glycerol, albumin or a rather high concentration of sodium chloride. By combining the aforesaid operations, it has now been made possible to raise the purity of the present enzymes by 100 to 1,500 times that of the enzymes in the in-vivo state as contained in the cells.

The following examples are given merely as illustrative of the present invention and are not to be considered as means of diethylaminoethyl (DEAE)-cellulose. Elution was then conducted by gradually increasing the concentration of a sodium chloride solution while maintaining the pH at 9.0. The thus-obtained enzymic liquid, representative of the present invention, was then freeze-dried. The purity of the resultant preparation was 1,300 times higher than that of the crude extract liquid obtained from the cells in Example 1.

EXAMPLE 3

A 90% saturated ammonium sulfate solution was added to a supernatant liquid having a pH of 3.5, obtained in accordance with Example 1. Precipitates were salted out as a result. The precipitates were collected and dissolved. The thus-obtained solution was subjected to dialysis, while its pH was maintained at 9.0, in a 0.01 M tris-buffer solution of pH 9.0 in a cellulose tube, the tube containing a small quantity of glycerol in its outer liquid. During the dialysis procedure, the L-asparaginase activity was almost quantitatively preserved. After dialysis, the resultant liquid was adsorbed by means of DEAE-cellulose wtthout further treatment and was eluted with a 0.01 M tris-buffer solution of pH 9.0, said buffer solution containing sodium chloride. The enzymic purity of the resultant eluted liquid was 660 times higher than that of the crude extract of cells obtained in Example 1.

The invention being thus described, it will be obvious that the same may be varied in many ways and may also be applied for the purification of L-asparaginase from bacterial cells of another microorganisms, such as *Escherichia coli, Erwinia aroideae* and *Erwinia carotovora*. Such variations are not to be regarded as a departure from the spirit and scope of the invention, and all such modifications as would be obvious to one skilled in the art are intended to be included herein.

We claim:

1. A process for purifying L-asparaginase from a crude extract, said extract being prepared from cells obtained by culturing an L-asparaginase-producing microorganism in a nutrient medium, which comprises the steps of adjusting the pH of said extract to 3.0 to 4.5, and denaturing and precipitating the impure proteins present in said extract liquid.

2. The process of claim 1, further comprising the steps of adsorbing a supernatant part of said acid treated extract with an ion exchanger and eluting said L-asparaginase therefrom.

3. The process of claim 1, further comprising the steps of adjusting the pH of a supernatant part of said acid treated extract to 8.0 or more, adsorbing the resultant supernatant with an ion exchanger and eluting said L-asparaginase therefrom.

4. The process of claim 1, further comprising the steps of adsorbing and eluting a supernatant part of said acid treated extract with a first ion exchanger, adjusting the pH of the eluate to 8.0 or more, adsorbing the resultant eluate with a second ion exchanger, and then eluting said L-asparaginase therefrom.

5. The process of claim 2, wherein said ion exchanger is carboxymethylcellulose.

6. The process of claim 3, wherein said ion exchanger is diethylaminoethylcellulose.

7. The process of claim 4, wherein said first ion exchanger is carboxymethylcellulose and said second ion exchanger is diethylaminoethylcellulose.

8. The process of claim 1, wherein said microorganism belongs to the genus Serratia.

9. The process of claim 1, wherein the pH of the extract is adjusted to 3.5–4.5.

10. The process of claim 2, wherein the eluting substance is sodium chloride solution.

11. The process of claim 2, wherein an enzyme stabilizer selected from the group consisting of L-asparagine, glycerol, albumin and sodium chloride is added to said supernatant.

12. A process for purifying L-aparaginase from a crude extract, said extract being prepared from cells obtained by culturing an L-asparaginase-producing microorganism belonging to *Serratia marcescens* in a nutrient medium, which comprises the steps of adjusting the pH of said extract to 3.5 to 4.5, and denaturing and precipitating the impure proteins present in said extract.

13. The process of claim 12, further comprising the steps of adding an enzyme stabilizer selected from the group consisting of L-asparagine, glycerol, albumin and sodium chloride to a supernatant part of said extract liquid, adsorbing said supernatant with carboxymethylcellulose, and eluting said L-asparaginase therefrom, the pH of the supernatant being maintained at 3.0–4.5.

14. The process of claim 13, further comprising the steps of electrodialyzing the resultant enzyme solution at a pH of 3.0–4.5, adjusting the pH of the liquid to 8.0–11.0, adsorbing the liquid with diethylaminoethylcellulose, and eluting said L-asparaginase therefrom.

15. The process of claim 12, further comprising the steps of dialyzing a supernatant of said treated extract at a pH of 8.0–11.0, adsorbing said supernatant with diethylaminoethylcellulose, and eluting said L-asparaginase therefrom.

References Cited

Rowley et al.: Biochemical and Biophysical Research Comm., vol. 28, pp. 160–165 (1967).

LIONEL M. SHAPIRO, Primary Examiner